United States Patent [19]
Matsumoto et al.

[11] Patent Number: 5,496,860
[45] Date of Patent: Mar. 5, 1996

[54] ANTIBACTERIAL FIBER, TEXTILE AND WATER-TREATING ELEMENT USING THE FIBER AND METHOD OF PRODUCING THE SAME

[75] Inventors: Nobuya Matsumoto; Shinichi Kunisaki; Goro Fujiwara; Mitsunobu Masuda, all of Osaka; Hiroshi Horie, Funabashi; Asaichi Kawanaka, Fujieda, all of Japan

[73] Assignees: Suntory Limited; Takuma Co., Ltd., both of Osaka; Nitivy Company Limited, Tokyo, all of Japan

[21] Appl. No.: 174,368

[22] Filed: Dec. 28, 1993

[30] Foreign Application Priority Data

Dec. 28, 1992 [JP] Japan ..................................... 4-347544
Dec. 28, 1992 [JP] Japan ..................................... 4-347555

[51] Int. Cl.$^6$ ....................................... C08F 8/42
[52] U.S. Cl. ..................... 521/31; 525/330.2; 525/332.2; 525/362; 525/370; 525/371
[58] Field of Search ............................... 521/31; 525/362, 525/370, 371

[56] References Cited

U.S. PATENT DOCUMENTS

| | | | |
|---|---|---|---|
| 4,500,396 | 2/1985 | D'Agostino et al. | 525/31 |
| 4,563,371 | 1/1986 | Sirinyan et al. | 521/31 |
| 5,158,603 | 10/1992 | Stierman et al. | 521/31 |
| 5,278,193 | 1/1994 | Eiffler et al. | 521/31 |

FOREIGN PATENT DOCUMENTS 62-28767 2/1987 Japan.

OTHER PUBLICATIONS

T. Miyasita et al., "Sen–I Gakkaishi 36(7) (1980), T–309".
Takashio: "Kogyozairyo (Industrial Materials)"; 31(5), 102.
"Kagaku Dai–Jiten (Large Dictionary of Chemistry)"; pp. 556, 558.

*Primary Examiner*—Bernard Lipman
*Attorney, Agent, or Firm*—Fisher & Associates

[57] ABSTRACT

An antibacterial fiber includes an ion exchange fiber and an antibacterial metal ion entrapped within the ion exchange fiber through an ion exchange reaction. The invention also discloses antibacterial textiles and water-treating element using the fibers.

5 Claims, 2 Drawing Sheets

ANTIBACTERIAL FIBER, TEXTILE AND WATER-TREATING ELEMENT USING THE FIBER AND METHOD OF PRODUCING THE SAME

BACKGROUND OF THE INVENTION

1. Field of the Invention

The present invention relates a fiber material to be used for producing textiles such as knitting fabric, nonwoven fabric, paper and also to the art relating thereto. The invention more particularly relates to an antibacterial fiber to be used in producing such textiles as requiring antibacterial property for destroying micro-organisms including bacteria and molds. The antibacterial products are used where a highly sanitary environment such as a germ-free environment is required, e.g. in medical fields, manufacturing and sales of medical products and food stuff, manufacture of semiconductors, and research/development and application of biotechnology. Some examples of such antibacterial products are textile products to be used in the sanitary environment including various types of work clothes, sheets, masks, dustcloths, wall papers and filter materials including a paper filter for e.g. providing clean air to a highly sanitary environment such as a clean room. The invention also relates to a method of producing the antibacterial fiber as well as to an antibacterial water-treating element using the antibacterial fiber.

2. Description of the Related Art

As described above, the antibacterial fibers have a wide variety of applications. As such antibacterial fiber, the prior art has provided an antibacterial synthetic resin fiber. In producing this synthetic resin fiber, first, an antibacterial material in the form of powder is produced by entrapping silver ion into synthetic or natural zeolite or by causing silver ion to be carried on a synthetic inorganic insoluble matter such as zirconia phosphate. Then, in a spinning bath, this antibacterial material is evenly dispersed within a synthetic resin as a raw material of the fiber. And, this synthetic resin mixed with the antibacterial material is formed into the fiber. The antibacterial synthetic resin fiber provides its antibacterial effect by the silver ion contained in the antibacterial material exposed on the outer surface of the fiber.

The above-described antibacterial synthetic resin fiber comprises the non-elutable type or elution-resistant type in which elution of the antibacterial material hardly occurs or does not occur at all. Thus, the antibacterial synthetic resin fiber is superior in the lastingness and stability of the effect to an antibacterial resin fiber using an elutable organic antibacterial material. However, the conventional antibacterial synthetic resin fiber still suffers drawbacks to be described next.

With the conventional antibacterial synthetic resin fiber, only a portion of the antibacterial material exposing on the outer surface of the synthetic resin fiber can provide the antibacterial effect. The remaining portion of the antibacterial material, i.e. the portion embedded inside the resin provides no contribution at all to the effect. Further, the fiber has a diameter ranging between 8 and 15 μm; whereas, the antibacterial material comprises super fine powder having a particle diameter not exceeding 2 μm, so as not to impair the original properties of the fiber when mixed with the antibacterial material as well as to promote dispersion of the antibacterial material through the resin. Naturally, the amount of the portion of the antibacterial material exposing its silver ion on the outer surface of the fiber is considerably limited and most of the material is embedded inside the resin disadvantageously. More specifically, experiments conducted by the present inventors show that an amount of the antibacterial material capable of providing the effect accounts for only less than ⅓ of the entire amount even with very uniform dispersion of the material in the synthetic resin. The resin needed 1.0 to 5.0% content of the antibacterial material in order to achieve a sufficient antibacterial effect. As a result, the product can provide only limited and unstable antibacterial effect relative to the considerable content of the antibacterial material present in the resin.

Moreover, the availability of the antibacterial material on the fiber surface significantly varies depending on the dispersion condition of the material in the synthetic resin. With uneven dispersion, the amount of antibacterial material exposed on the fiber surface is further limited to provide almost no effect at all. Then, uniform dispersion of the antibacterial material is essential for obtaining a product of stable quality, i.e. antibacterial effect. However, in order to achieve such uniform dispersion, high precision is required in the operations and controls throughout the manufacturing processes from the mixture step of the antibacterial material with the resin to the spinning step of the mixture. All these have tended to result in disadvantageous cost increase.

In addition to the above, the large amount of antibacterial material embedded inside the resin is placed in contact with the surrounding synthetic resin fiber, so that a chemical reaction inevitably occurs between the silver ion of the embedded antibacterial material and the synthetic resin fiber and the reaction can cause disadvantageous discoloration and/or quality deterioration in the resin.

Taking the above-state of the art into consideration, a primary object of the present invention is to provide an improved antibacterial fiber which is economical but can provide antibacterial effect in a stable manner without causing disadvantageous quality change in the fiber.

SUMMARY OF THE INVENTION

For accomplishing the above-noted object, an antibacterial fiber, according to the present invention, comprises:

an ion exchange fiber; and an antibacterial metal ion entrapped within the ion exchange fiber through an ion exchange reaction.

Preferably, the ion exchange fiber comprises a cation exchanges fiber having sulfonic group or carboxyl group as ion exchange group thereof. The antibacterial metal ion is bonded through the ion exchange reaction with less than 50% of the ion exchange group with respect to an ion exchange capacity of the cation exchange fiber. The metal ion comprises silver ion or combination of silver ion with either copper ion or zinc ion.

According to the above-described composition, the antibacterial fiber comprises the ion exchange fiber and the antibacterial metal ion such as silver ion or copper ion or zinc ion entrapped within the ion exchange fiber through an ion exchange reaction. Thus, all of the antibacterial metal ion is exposed on the surface of the ion exchange fiber, leaving no antibacterial metal ion embedded therein, such that the antibacterial effect is available from the entire antibacterial metal ion.

Moreover, the metal ion such as silver ion is bonded with the ion exchange fiber through an ion exchange reaction. Then, in the course of the ion exchange reaction operation such as supplying the ion exchange fiber with a solution containing the metal ion or bonding complex ion of the metal(s) with the ion exchange fiber then reducing it by hydrazine or hydrogen. The amount of the metal ion to be entrapped within the ion exchange fiber is appropriately determined in accordance with the amount of this ion exchange fiber. Through this simple operation alone, it is possible to precisely control the amount of the antibacterial metal ion to be exposed on the fiber surface for providing desired antibacterial effect.

Further, in the fiber, the metal ion such as silver ion is present as being bonded with the ion exchange group of the ion exchange fiber. Thus, in a textile made by spinning this antibacterial fiber with an ordinary fiber (e.g. polyester, teflon etc.), there occurs no disadvantageous chemical reaction between the metal ion and the ion exchange fiber.

In particular, even more effective antibacterial property can be obtained by bonding the metal ion with less than 50% of the ion exchange group with respect to the ion exchange capacity of the ion exchange fiber.

A method of producing an antibacterial fiber, according to the present invention, comprises the steps of:

bonding, through an ion exchange reaction, a cation having one or two valency with entire ion exchange group of a cation exchange fiber having sulfonic group or carboxyl group as ion exchange group thereof;

substituting silver ion alone or combination of silver ion with either copper ion or zinc ion for the cation bonded with a portion of the ion exchange group.

According to the above-described method, it is advantageously possible to obtain an antibacterial fiber comprising ion exchange fiber entrapping metal ion therein by an ion exchange reaction alone.

According to further aspect of the present invention, a method of producing an antibacterial fiber comprises the steps of:

bonding, through an ion exchange reaction, complex ion of silver, copper or zinc with ion exchange group of cation exchange fiber having sulfonic or carboxyl group as ion exchange group thereof; and reducing the complex ion.

With this method, it is advantageously possible to obtain an antibacterial fiber comprising cation exchange fiber entrapping metal ion therein.

According to a further aspect of the present invention, a method of producing an antibacterial fiber comprises the steps of:

bonding, through an ion exchange reaction, complex ion of silver, copper or zinc with ion exchange groups of an anion exchange fiber having primary through tertiary amine groups and quaternary ammonium group; and reducing the complex ion.

With this method, it is advantageously possible to obtain an antibacterial fiber comprising anion exchange fiber entrapping metal ion therein.

The antibacterial fiber as defined in the appended claims 1 through 3 can be mixed with a fibrous material such as knitting fabric, nonwoven fabric, paper or felt.

With this, it is possible to provide knitting fabric, nonwoven fabric, paper or felt with antibacterial property due to this property inherent in the antibacterial fiber mixed therein.

As described above, according to the methods of the present invention, all of the metal ion such as silver ion, copper ion or zinc ion having antibacterial property can be exposed on the surface of the ion exchange fiber, so that the antibacterial effect of the entire metal ion can be fully utilized. This, in turn, allows reduction in the amount of the expensive metal such as silver to be used and resultant reduction in the production costs. Further, the obtained antibacterial fiber, though produced through the simple and easy operations, can provide the antibacterial effect in stable manner without the inconvenience of decoloration or quality deterioration in the ion exchange fiber.

According to the method defined in claim 1, it is possible to obtain an antibacterial fiber by using a cation exchange fiber.

According to the further method defined in claim 2, it is possible to obtain an antibacterial fiber by using an anion exchange fiber.

Further, by effectively utilizing the above-described antibacterial fiber, the invention also affords the possibility of providing antibacterial knitting fiber, nonwoven fiber, paper or felt which can be advantageously used as a material for producing textile products usable under a situation where a germ-free or sterilized condition is required.

The present invention also affords the possibility of providing an antibacterial water-treating element for use in a water purifier for domestic or industrial use in order to destroy micro-organism such as germ, mold or algae.

The water-treating element of the present invention comprises a plurality of cation exchange fibers shaped into a predetermined configuration having water-permeability, with each fiber being formed by bonding, through an ion exchange reaction, silver ion with a portion of ion exchange group of the cation exchange fiber while cation having one or two valency being bonded with a remaining portion of ion exchange group of the ion fiber.

Preferably, the fibers are shaped into such predetermined configuration having water-permeability by bonding the cation exchange fibers with a binder such as a resin.

Alternately, the fibers can be formed into a container-like component having inlet and outlet openings for the water.

According to the above-described construction, since the cation exchange fibers are bonded with silver ion as a metal ion having antibacterial property, all of the antibacterial metal ion entrapped within the cation exchange fibers can be exposed on the surface of the fibers for providing the antibacterial effect to the water passing through the element. As a result, even if the water stays stagnant inside the element due to stop of water supply (passage), the element can destroy germ, mold or algae present in the stagnant water, thereby to maintain this water under germ-free or sterilized condition.

Further, all the antibacterial metal ion is exposed on the surface of the fiber for providing the antibacterial effect in an efficient manner. That is, by effectively utilizing the advantage that the amount of antibacterial metal ion can be minimum for providing a fixed magnitude of antibacterial effect, silver ion is not bonded with all of the ion exchange group (—$SO_3H$, —COOH or the like) of the cation exchange fiber but with only a portion of the ion exchange group and cation having one or two valency such as sodium, calcium, magnesium is bonded with the remaining portion of the ion exchange group of the cation exchange fiber, thereby to provide the treated water with ion of such heavy metal as lead zinc, iron or chrome. Then, through the ion exchange reaction, the ion exchange group bonded previously with the cation can be selectively bonded with such heavy metal ion, such that the cation exchange fibers can entrap the heavy metal ion present in the water.

Moreover, since the ion exchange fiber thus obtained can achieve an ion exchange velocity more than 20 times higher than the conventional ion exchange resin and has a permeable capacity for the heavy metal ion, entrapping of the heavy metal ion can be effected reliably with a high SV (space velocity) value ranging between 1000 and 5000 even if the concentration of the heavy metal ion is low.

In addition, as the antibacterial metal ion, silver ion having relatively small ionization tendency is selected. Accordingly, there occurs relatively fewer opportunities of substitution of the antibacterial metal ion for another ion during passage of the water through the element in the case of e.g. drinking water having a low concentration of chloride solution. Thus, the bonding condition between the antibacterial metal ion with the ion exchange group may be very stable.

Therefore, the above-described construction can provide both the antibacterial effect and the heavy-metal elimination effect.

According to a still further aspect of the present invention, a water-treating element comprises a plurality of ion exchange fibers each having a portion of ion exchange group thereof bonded with silver ion and a remaining portion of ion exchange group bonded with cation of one or two valency, the cation exchange fibers being mixed with activated carbon, the fibers and the activated carbon being shaped into such predetermined configuration having water-permeability by bonding the fibers and the carbon with a binder.

According to a still further aspect of the invention, a water-treating element comprises a plurality of cation exchange fibers each having a portion of ion exchange group thereof bonded with silver ion and a remaining portion of ion exchange group bonded with cation of one or two valency, the cation exchange fiber being mixed with activated carbon, the fibers and the carbon being formed into a container-like component having inlet and outlet openings for the water.

Further, it is conceivable to use the water-treating element in combination with the further water-treating element formed together with activated carbon into a predetermined configuration having water-permeability through a binder, with the two elements being disposed side by side in a direction of passage of water.

Also, it is conceivable to use the water-treating element in combination with the further water-treating element formed together with activated carbon into a container-like configuration having inlet and outlet openings for water, with the two elements being disposed side by side in a direction of passage of water.

As the antibacterial water-treating element of the present invention, it is further conceivable to use, in combination, the further water-treating element comprised of activated carbon filled into a container having a water inlet and a water outlet in such a manner as to obtain water-permeability and the water-treating element including a plurality of cation exchange fibers each having a portion of ion exchange group thereof being bonded, through an ion exchange reaction, with silver ion while the remaining portion of the group being bonded with cation of one or two valency, with the fibers being shaped into a predetermined configuration having water-permeability or with the fibers being filled within a cartridge having a water inlet and a water outlet in such a manner as to obtain water-permeability, such that the two elements being disposed side by side in a direction of water passage.

With the above arrangements, it becomes possible also to eliminate, by means of the activated carbon, organic matter or free chlorine present in the water to be passed through the element(s).

In particular, in case the activate carbon is mixed with the cation exchange fibers, the treatable amount of water per 1 g of the activated carbon in the free chlorine eliminating activity of the activated carbon increases advantageously. According to the experiments conducted by the present inventors, the uniform mixture of the activated carbon and the cation exchange fibers, due to the significant improvement in the free chlorine eliminating ability per 1 g of activated carbon, was found to achieve the increase in the treatable amount of water, in comparison with use of the activated carbon alone. For instance, to be described in more details later, under a very high space velocity condition of SV=5000 for a water purifier, the treatable amount of water for eliminating more than 80% of free chlorine in the water having 2 ppm of free chlorine 100 to 150 l/g in the case of the activated carbon alone whereas the amount was 250 to 300 l/g in the case of the uniform mixture of the activated carbon and the cation exchange fibers, with the specific surface area of the activated carbon being 1500 $m^2/g$ in the both cases. Then, since the cation exchange fibers alone has no free chlorine eliminating effect, it is clear that the cation exchange fibers contribute to promotion of the reaction speed of the adsorption of the free chlorine by the activated carbon.

According to a still further aspect of the present invention, the antibacterial water-treating element preferably has a density ranging above 0.13, the density being obtained by dividing a weight by a volume of the element.

That is, in the case of the product formed by the cation exchange fibers or the activated carbon alone or by binding the mixture thereof by means of a binder, if the density obtained by its weight by the volume is lower than 0.13, the product will allow passage of the suspended substance contained in the water, thus failing to filter the substance. Then, if the density is above 0.13, such suspended substance can be filtered and eliminated.

With the above arrangement, it becomes advantageously possible to eliminate organic substance and free chlorine in the passing water as well.

That is to say, the product achieves also the filtering effect for the suspended substance as well. In particular, in case fibrous activated carbon is used as the activated carbon, the density of the same should preferably be lower than 0.25, although it may depend on the fiber diameter of the fibrous activated carbon and also on the supply pressure of the water to be passed. That is, if the density is higher than 0.25, there occurs significant pressure loss in the course of the water passage. And, if the pressure is lower than 1 to 2 $kg/cm^2$, there occurs reduction in the amount of water passage, so that the product can not operate at a desired flow amount. However, if the water supply passage may be higher, the density may be higher than 0.25.

In the antibacterial water-treating element of the present invention, the amount of the cation exchange fibers may be set lower than 50% of the entire weight of the element.

With the above arrangement, the replacement cycle of the cation exchange fiber and that of the activated carbon become substantially the same as each other. The replacement of these may be effected at one time. In particular, if the activated carbon and the cation exchange fibers are used in the mixed state, the arrangement can eliminate the wasteful replacement of the entire mixture element when only the cation exchange fibers should be replaced since the activated carbon still maintains its adsorbing ability or conversely when only the activated carbon should be replaced since the cation exchange fibers still maintain the heavy metal eliminating ability.

That is, considering that the ion exchange fibers have a large capacity for the heavy metal ion and that the ion exchange fibers can effectively entrap the heavy metal ion even if the heavy metal ion is low in concentration, the weight ration of the cation exchange fibers is set at lower than 50% relative to the entire weight of the element. That is to say, the weight amount of the activated carbon is set at more than 50% of the entire element. Such that, the life cycle of the cation exchange fibers in terms of the heavy metal eliminating effect and the life cycle of the activated carbon are caused to correspond to each other, thereby to substantially synchronize the replacement cycles of these.

According to a further aspect of the present invention, the amount of the ion exchange group bonded with silver ion is set less than 20% of the total exchange capacity of the ion exchange group of the entire cation exchange fibers.

With retaining the advantages of providing the antibacterial and heavy metal eliminating effects, this element provides a further advantage of allowing reduction in the amount of expensive silver to be used in the element.

According to a still further aspect of the present invention, the water-treating element contains the cation exchange fibers in an amount ranging less than 50 wt. % of the amount of the activated carbon.

Further and other objects, features and effects of the invention will become more apparent from the following more detailed description of the embodiments of the invention with reference to the accompanying drawings.

DESCRIPTION OF THE PREFERRED EMBODIMENTS

Figure 1:
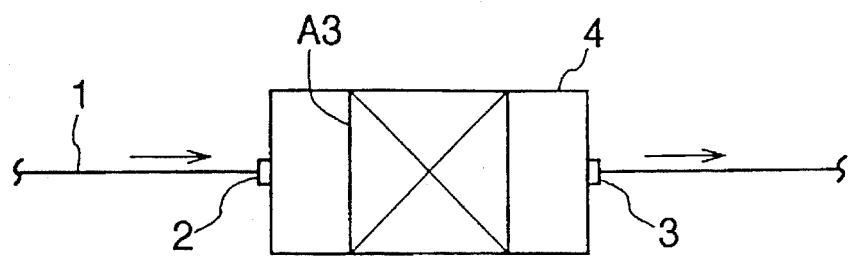
FIG. 1 is a schematic construction view showing a first embodiment of an antibacterial water-treating element.

An antibacterial fiber comprises ion exchange fiber and an antibacterial metal ion entrapped within the ion exchange fiber through an ion exchange reaction.

The ion exchange fiber includes cation exchange fiber and anion exchange fiber.

The antibacterial metal ion includes silver ion, copper ion, zinc ion and so on. In the present invention, one or a plurality kinds of these are employed. Specifically, the invention uses silver ion alone, or combination of silver ion and copper ion, or combination of silver ion and zinc ion.

Further, the metal ion is bonded with ion exchange group of less than 50% of entire ion exchange capacity of the ion exchange fiber. Yet, the metal ion may be bonded with the ion exchange group of more than 50% as well.

The cation exchange fiber includes, as the ion exchange group thereof, sulfonic group or carboxyl group. Next, there will be described some methods of producing antibacterial fibers comprising the cation exchange fiber entrapping the metal ion.

EXAMPLE 1

The metal ion is directly bonded with the ion exchange group of the cation exchange fiber.

EXAMPLE 2

The entire ion exchange group of the cation exchange fiber is bonded, through an ion exchange reaction, with cation having one or two valencies, thereby to render the entire ion exchange group into salt type. Then, a portion of this salt type ion exchange group is bonded with the metal ion through ion exchange reaction.

EXAMPLE 3

The cation exchange fiber is bonded, through ion exchange reaction, with a complex metal ion. Then, the complex metal ion is reduced by a reducing agent such as hydrazine or hydrogen.

The anion exchange fiber includes, as ion exchange group thereof, primary through tertiary amine and quaternary ammonium group. Next, there will be described a specific method of producing antibacterial fiber using such anion exchange fibers.

EXAMPLE 4

Through ion exchange reaction, complex metal ion is bonded with ion exchange group of anion exchange fiber. Then, the complex metal ion is reduced by a reducing agent such as hydrazine or hydrogen.

The above-described antibacterial fiber is used as a raw material for producing textiles such as knitting fabric, non-woven fabric, paper or the like. The antibacterial textile may be used alone or may be used in combination by spinning with a non-antibacterial textile. In short, the textile contains the antibacterial fabric for providing the antibacterial effect.

Next, there will be described such antibacterial textiles and specific methods of producing these textiles.

Specific Example 1

In aqueous solution of silver nitrate having 9.5 g/l concentration, 200 g of strong cation exchange fiber (H type) having a cut length of 0.5 mm, a single-fiber fineness of 5 d, and a strong cation exchange capacity of 2.5 meq./g was submerged to have ion exchange group thereof bonded with silver ion. After water-flushing, the fiber was submerged in aqueous solution of copper sulfate having a concentration of 40 g/l to have the ion exchange group bonded with copper ion, whereby an antibacterial fiber comprising the strong cation exchange fiber entrapping silver ion and copper ion was obtained. In the obtained fiber, it was observed that silver ion was bonded with 4.5% of ion exchange group relative to the ion exchange capacity of the strong cation exchange fiber and copper ion was bonded with 11.2% of ion exchange group.

Specific Example 2

In aqueous solution of silver nitrate having 6.5 g/l concentration, 200 g of strong cation exchange knitted-like fiber (H type) having a single-fiber fineness of 15 d, and a strong cation exchange capacity of 2.2 meq./g was submerged to have ion exchange group thereof bonded with silver ion. After water-flushing, the fiber was submerged in aqueous solution of zinc sulfate having a concentration of 14.6 g/l to have the ion exchange group bonded with zinc ion, whereby an antibacterial fiber comprising the strong cation exchange fiber entrapping silver ion and zinc ion was obtained. In the obtained fiber, it was observed that silver ion was bonded with 6.2% of ion exchange group relative to the ion exchange capacity of the strong cation exchange fiber and zinc ion was bonded with 9.0% of ion exchange group.

Specific Example 3

In aqueous solution of silver nitrate having a concentration of 1.0 g/l, a nonwoven fabric (230 g/m$^2$) having 2 mm thickness and containing a strong cation exchange fiber (Ca type) having a single-fiber fineness of 10 d and polyester fiber in the ratio of 70 to 30% was submerged to have ion exchange group of the ion exchange fiber bonded with silver ion, thereby to obtain an antibacterial fiber in the form of nonwoven fiber including the non-antibacterial polyester fiber spun with the strong cation exchange fiber entrapping silver ion. In the obtained nonwoven fiber (i.e. antibacterial fiber), it was observed that silver ion was bonded with 2.9% of ion exchange group with respect to the ion exchange capacity of the strong cation exchange fiber.

Specific Example 4

A strong cation exchange fiber (Na type: 750 d/50 f) having a single-fiber fineness of 15 d and a strong cation exchange capacity of 2.2 meq/g was rendered into the form of hank by applying a twisting force of 60 t/m to the fiber. Then, following steps (1) and (2) were effected in this order to obtain an antibacterial fiber in the form of yarn comprising the strong cation exchange fiber entrapping silver ion.

(1) 200 g of the strong cation fiber in the form of hank was submerged in a diluted aqueous solution of ammonia containing 20 g of silver nitrate, thereby to cause the ion exchange group of the fiber to be bonded with complex ion of silver.

(2) After sufficient water-flushing, the fiber was submerged in 0.2% aqueous solution of hydrazine to reduce the complex ion into silver ion.

In the obtained yarn (i.e. antibacterial fiber in the form of yarn), it was observed that silver ion was bonded with 6.1% of ion exchange group relative to the ion exchange capacity of the strong cation exchange fiber. And, the fiber was flexible and weavable.

Specific Example 5

In diluted aqueous solution of ammonia having a silver nitrate concentration of 2.8 g/l and a copper sulfate concentration of 4.4 g/l, a nonwoven fabric (400 g/m$^2$) having 5 mm thickness and containing a strong cation exchange fiber (Ca type) having a single-fiber fineness of 10 d and polyester fiber in the ration of 70 to 30% was submerged to have ion exchange group of the ion exchange fiber bonded with complex ion of silver and copper, then, after water-flushing, the fiber was submerged in 0.5% aqueous solution of hydrazine to reduce each complex ion of silver and copper into silver ion and copper ion, thereby to obtain an antibacterial fiber in the form of nonwoven fiber including the non-antibacterial polyester fiber spun with the strong cation exchange fiber entrapping silver ion and copper ion. In the obtained nonwoven fiber (i.e. antibacterial fiber), it was observed that silver ion was bonded with 4.2% of ion exchange group with respect to the ion exchange capacity of the strong cation exchange fiber and copper ion was bonded with 4.3% of ion exchange group.

Specific Example 6

In aqueous solution of silver nitrate having 8.8 g/l concentration, 200 g of weak cation exchange fiber (Mg type) having a cutting length of 1 mm, a single-fiber fineness of 6 d, and a weak cation exchange capacity of 4.5 meq./g was submerged to have ion exchange group thereof bonded with complex ion of silver. After sufficient water-flushing, the fiber was submerged in 0.1% aqueous solution of hydrazine to reduce the complex ion into silver ion, whereby an antibacterial fiber comprising the weak cation exchange fiber entrapping silver ion was obtained. In the obtained fiber, it was observed that silver ion was bonded with 5.5% of ion exchange group relative to the ion exchange capacity of the weak cation exchange fiber.

Specific Example 7

A strong anion exchange fiber (400 d/80 f) having a single-fiber fineness of 5 d and s strong anion exchange capacity of 1.8 meq/g was rendered into the form of hank by applying a twisting force of 100 t/m to the fiber. Then, following steps (1) and (2) were effected in this order to obtain an antibacterial fiber in the form of yarn comprising the strong anion exchange fiber entrapping silver ion.

(1) 200 g of the strong anion fiber in the form of hank was submerged in diluted aqueous solution of hydrochloric acid containing 13 g of silver chloride, thereby to cause the ion exchange group of the fiber to be bonded with complex ion of silver chloride.

(2) After sufficient water-flushing, the fiber was submerged in 0.5% aqueous solution of hydrazine to reduce the complex ion of silver chloride into silver ion.

In the obtained yarn (i.e. antibacterial fiber in the form of hank), it was observed that silver ion was bonded with 3.7% of ion exchange group relative to the ion exchange capacity of the strong anion exchange fiber. And, the fiber was flexible and weavable.

Next, there will be described experiments conducted by the present inventors in order to confirm the antibacterial effect of the antibacterial fiber of the present invention.

Experiment 1

A performance test was conducted to compare performance of the antibacterial fiber of the present invention with that of an antibacterial fiber of the prior art. In the test, the antibacterial fibers were mixed by a predetermined ratio with conventionally available non-antibacterial fibers to be rendered together into sample textiles. The mixture ratio comprise weights of the antibacterial fiber with respect to the total weights of the textiles. At the same time, a further test was conducted on the non-antibacterial fiber (blank).

In the antibacterial fiber of the present invention used in the test, silver ion was bonded with 5% of ion exchange group with respect to the ion exchange capacity of cation exchange fiber. As to the conventional antibacterial fiber used in the test, the fiber comprises antibacterial nylon fiber containing 3 wt. % of antibacterial material evenly dispersed in raw material of nylon resin. The antibacterial material comprised zeolite and silver ion bonded with 5% of ion exchange group of the zeolite. The material had a particle diameter of 2 μm.

For the test, 1 ml of germ-containing liquid was placed on the sample fibers, and cultivation was effected for 24 hours at 36 degrees in Celsius. Then, the numbers of germs were counted. The germ-containing liquid contained $4.7 \times 10^7$ cells of *Escherichia coli* per 1 ml of the liquid. Incidentally, three samples were prepared for each test piece.

The results are shown in Table 1, in which a mark 'ND' denotes no detection.

Experiment 2

For the same object as the above experiment 1, nonwoven fabric, rather than textile, was used as the specimen. All the other conditions were the same as those of the experiment 1. The results of this experiment are shown in Table 2.

Experiment 3

The object of this experiment was to study difference in effect due to difference of the kind of the metal ion to be entrapped within the ion exchange fiber. Non-antibacterial fiber (blank) was also studied.

As the antibacterial fibers, three types were used; namely, one type in which silver ion alone is entrapped within cation exchange fiber (Ag type), another type in which silver ion and copper ion are entrapped within cation exchange fiber (Ag-Cu type) and the other type in which silver ion and zinc ion are entrapped within cation exchange fiber (Ag-Zn type).

More specifically, in the case of the Ag type antibacterial fiber, silver ion was bonded with 5% of ion exchange group of ion exchange capacity of the cation exchange fiber. In the case of the Ag-Cu type antibacterial fiber, silver ion was bonded with 4% of ion exchange group of ion exchange capacity of the cation exchange fiber and copper ion was bonded with 1% of the same. In the case of the Ag-Zn type antibacterial fiber, silver ion was bonded with 4% of ion exchange group of ion exchange capacity of the cation exchange fiber and zinc ion was bonded with 1% of the same.

Then, like the experiment 1, the antibacterial fibers were mixed by a predetermined mixture ratio with conventional non-antibacterial nylon fiber to be rendered together into sample textiles. And, on these sample textiles, experiments were conducted under the same conditions as specified in the experiment 1. The results are shown in Table 3.

Experiment 4

For the same object as the above experiment 3, nonwoven fabric, rather than textile, was used as the specimen. All the other conditions were the same as those of the experiment 3. The results of this experiment are shown in Table 4.

As may be seen from the results of the experiments 1 and 2, the antibacterial fabric of the present invention, even with less amount of silver ion, is capable of achieving the antibacterial effect in a more reliable manner than the convention. This may be attributable to the fact that the entire silver ion is exposed on the surface of the ion exchange fiber for efficiently providing the antibacterial effect.

As may be seen from the results of the experiments 3 and 4, the Ag type, Ag-Cu type and Ag-Zn type antibacterial fibers of the present invention do not differ in their antibacterial effect. Accordingly, considering the results of these experiments 3 and 4 in view of those of the experiments 1 and 2, although no comparison tests were conducted with the convention, it may be understood that these Ag, Ag-Cu and Ag-Zn type antibacterial fibers of the invention are all superior in the antibacterial effect to the conventional products.

Further, it may be also understood that the antibacterial fiber can provide the effect even when the fiber is mixed with other non-antibacterial fiber into the form of textiles such as fabric or nonwoven fabric. Therefore, the antibacterial fiber of the present invention may be used as a raw material for producing entirety or a part of various kinds of textiles such as knitting fabric, nonwoven fiber, felt, paper or paper filter for use in a clean room, such that the textiles obtain the antibacterial property from the antibacterial fabric contained therein.

Then, the textiles produced by using the antibacterial fiber of the present invention find a wide variety of applications in the fields of medicine, manufacture and sales of medical products, manufacture and sales of food stuff, manufacture of semiconductors, biotechnology and so on. In particular, the textiles can be conveniently used in such products as work clothes, masks, gauzes, dust cloth, sheets, covers, wall papers to be used in the above-listed environments.

Next, embodiments of a water-treating element using the antibacterial fiber will be described with reference to the accompanying drawings.

EMBODIMENT 1

As shown in FIG. 1, this embodiment relates to a water purifier to be incorporated within a water supply passage 1 for purifying water passing therethrough. The water purifier comprises a water-treating element disposed in a case 4 having a water inlet opening 2 and a water outlet opening 3 so as to allow passage of entire water flowing from the inlet opening 2 to the outlet opening 3.

This water-treating element A3 contains, in a mixed state, cation exchange fiber having a portion of ion exchange group thereof bonded through ion exchange reaction with silver ion and having the remaining portion of ion exchange group bonded through ion exchange reaction with cation having valency of one or two (e.g. sodium, calcium, magnesium and so on) and contains also fibrous activated carbon. The ion exchange fiber and the activated carbon are present in the mixed state in the element and are bound to each other through a binder (resin) into a predetermined configuration of the element having water-permeability. Thus, the silver ion of the element provides antibacterial effect through physical contact thereof with micro-organisms (germs, mold, algae) present in the water and the fibrous activated carbon provides the effect of eliminating organic matters and free chlorine in the water.

The amount of the ion exchange group bonded with silver ion is set at less than 20% of the entire ion exchange capacity of the ion exchange group of the cation exchange fiber, and the amount of the cation exchange fiber is set at less than 50 wt. % of the amount of the fibrous activated carbon.

Further water-treating element A3, in the formed state thereof, has a density (weight divided by volume) of more than 0.13, preferably lower than 0.25 or 0.23.

Accordingly, this water-treating element A3 has a filtering effect, as well as the antibacterial effect. Further, since the density is less than 0.25, the element is capable of treating a predetermined amount of water even under a low pressure condition of 1 to 2 $kg/cm^2$ without inviting excessive pressure loss.

Incidentally, the water-treating element A3, i.e. the antibacterial water-treating element can be fixedly accommodated within the case 4 or can be formed as a replaceable cartridge detachably attached to the case 4.

EMBODIMENT 2

Figure 2:
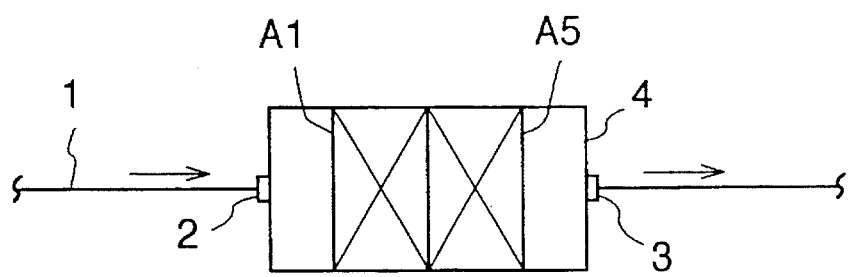
FIG. 2 is a schematic construction view showing a second embodiment of an antibacterial water-treating element.

In this embodiment, two kinds of water-treating elements A1, A5 are used in combination as shown in FIG. 2. Namely, a water-treating element A1 and a water-treating element A5 are detachably disposed side by side in the water passage direction within the casing 4.

The one water-treating element A1 comprises a plurality of the cation exchange fibers (the same fiber as described in the embodiment 1) having a portion of ion exchange group thereof bonded with silver ion and the remaining portion of the ion exchange group bonded with cation having valency of one or two (e.g. sodium, calcium, magnesium and so on), with the fibers being bound through a binder (resin) into a predetermined configuration having water-permeability.

In operation, this element A1, due to the cation exchange fibers having the ion exchange group being bonded with the cation, provides the heavy metal eliminating effect. Also, the element A1, through its silver ion, provides the antibacterial effect to destroy micro-organisms organisms.

The other water-treating element A5 comprises fibrous activated carbon formed by means of a binder (resin) into a predetermined configuration having water-permeability, so that the water passing through this element has its organic matter and free chlorine content therein eliminated by the element.

Accordingly, the antibacterial water-treating element provides the heavy metal eliminating effect, antibacterial effect and the adsorbing effect, like the element of the foregoing embodiment 1.

Further, both of the water-treating elements A1 and A5, in the formed states thereof, have a density (weight divided by volume) higher than 0.13 and preferably lower than 0.25 or 0.23. That is, due to the density higher than 0.13, both of the elements A1, A5 provide the filtering effect for suspended substance. Further, due to the density being lower than 0.25, the elements can treat a predetermined amount of water, without inviting the pressure loss even under a low pressure condition of 1 to 2 $kg/cm^2$. The relationship between the amount of the cation exchange fiber and that of the fibrous activated carbon is the same as the embodiment 1.

The two water-treating elements A1, A5 may be bonded integrally with each other by means of e.g. adhesion. Instead, these elements can be provided separately from each other. Further, like the embodiment 1, the elements can be fixedly disposed within the case 4 or can be formed as a replaceable cartridge.

In addition, as to the disposing arrangement of the two elements A1, A5, the one water-treating element A1 may be disposed upstream of the other element A5, so that the water passes the elements A1, A5 in this order. Alternatively, the other water-treating element A5 may be disposed upstream of the element A1, so that the water passes these elements A5, A1 in this order.

EMBODIMENT 3

Figure 3:
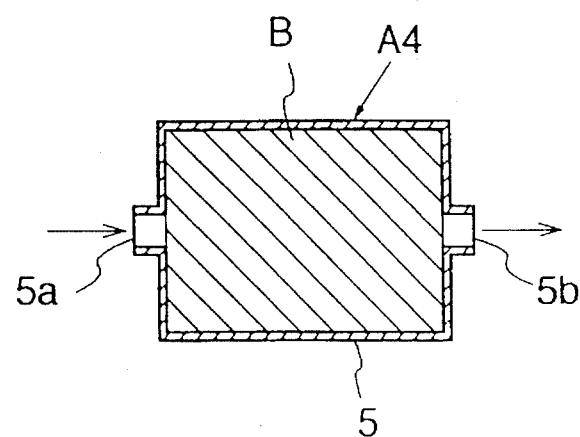
FIG. 3 is a section view showing a further embodiment of the antibacterial water-treating element.

This embodiment relates to an antibacterial water-treating element to be disposed within a case of a water purifier. As shown in FIG. 3, a water-treating element A4 comprises the uniform mixture B of the embodiment 1 including the cation exchange fibers and the fibrous activated carbon filled in a container 5 having a water inlet 5a and a water outlet 5b, the mixture being filled in such a manner as to obtain water-permeability. The relationship between the amount of the cation exchange fiber and that of the fibrous activated carbon is the same as the embodiment 1.

This water-treating element A4 comprising the mixture-filled container, i.e. the antibacterial water-treating element, like that of the embodiment 1, can provide the heavy metal eliminating effect since its cation exchange fiber having an ion exchange group bonded with the cation and provide also the antibacterial effect due to the silver ion bonded with the cation exchange fiber. The element further provides the adsorbing effect due to the presence of the fibrous activated carbon.

EMBODIMENT 4

Figure 4:
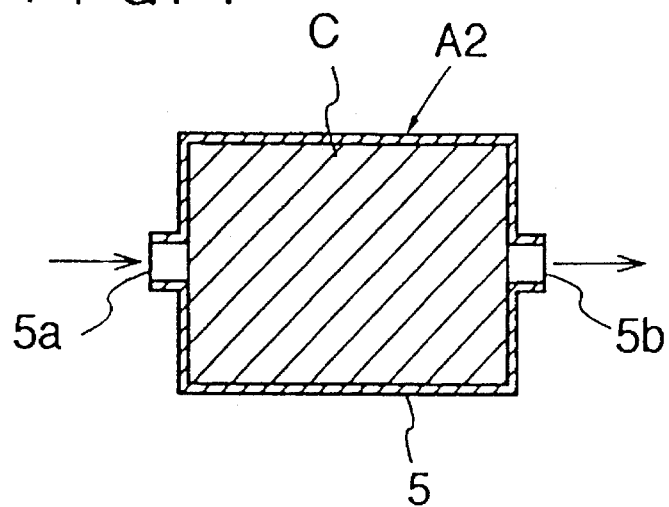
FIG. 4 is a section view showing a further embodiment of the antibacterial water-treating element.

This embodiment relates to an antibacterial water-treating element to be disposed within a case of a water purifier. As shown in FIG. 4, a water-treating element A2 comprises the cation exchange fibers C of the embodiment 1 filled within the case 5 of the embodiment 3 having the water-permeability.

This water-treating element A2 comprising the container filled with the cation exchange fibers, i.e. the antibacterial water-treating element can provide the heavy metal eliminating effect since its cation exchange fiber C having an ion exchange group bonded with the cation and provide also the antibacterial effect due to the silver ion bonded with the cation exchange fiber C.

EMBODIMENT 5

Figure 5:
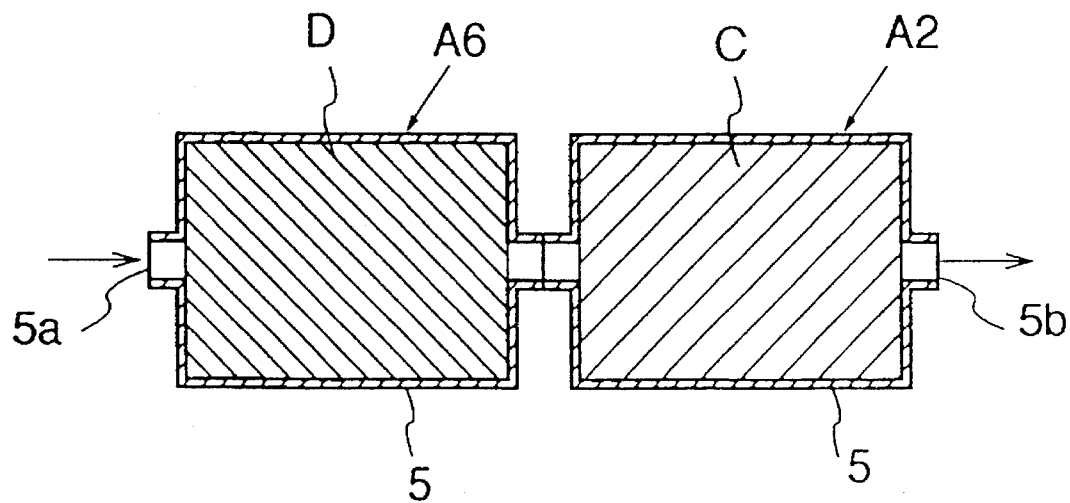
FIG. 5 is a section view showing a still further embodiment of the antibacterial water-treating element.

This embodiment relates to an antibacterial water-treating element to be filled within a case of a water purifier. As shown in FIG. 5, a water-treating element A6 comprises fibrous activated carbon D filled within the case 5 of the embodiment 3 to obtain water-permeability. And, the element A2 of the embodiment 4 comprising the container filled with the cation exchange fibers is also used. Then, the elements A6 and A2 are disposed in this order in the water passing direction.

The water-treating element A6 comprising the container-filled activated carbon, due to its fibrous activated carbon, provides the adsorbing effect.

Accordingly, the entire antibacterial water-treating element provides the heavy metal eliminating effect, the antibacterial effect and the adsorbing effect. The relationship between the amount of the cation exchange fiber and that of the fibrous activated carbon is the same as the embodiment 1.

As to the disposing arrangement of the two elements A2, A6, the one water-treating element A2 may be disposed upstream of the other element A6, so that the water passes the elements A2, A6 in this order. Alternatively, the other water-treating element A6 may be disposed upstream of the element A2, so that the water passes these elements A6, A2 in this order.

EMBODIMENT 6

This embodiment relates to an antibacterial water-treating element to be filled within a case of a water purifier. This antibacterial water-treating element comprises the water-treating element A2 of the embodiment 4 comprising the container filled with the cation exchange fibers and the water-treating element A5 comprising the formed activated carbon, with the elements A2, A5 being disposed in this order in the water passing direction.

Accordingly, the entire antibacterial water-treating element provides the heavy metal eliminating effect, the antibacterial effect, the adsorbing effect and the filtering effect for filtering suspended substance.

The relationship between the amount of the cation exchange fiber and that of the fibrous activated carbon is the same as the embodiment 1.

As to the disposing arrangement of the two elements A2, A5, the one water-treating element A2 may be disposed upstream of the other element A5, so that the water passes the elements A2, A5 in this order. Alternatively, the other water-treating element A5 may be disposed upstream of the element A2, so that the water passes these elements A5, A2 in this order.

EMBODIMENT 7

This embodiment relates to an antibacterial water-treating element to be filled within a case of a water purifier. This antibacterial water-treating element comprises the water-treating element A1 of the embodiment 2 comprising the formed cation exchange fibers and the water-treating element A6 of the embodiment 5 comprising the container-filled activated carbon, with the elements A1, A6 being disposed in this order in the water passing direction.

Accordingly, the entire antibacterial water-treating element provides the heavy metal eliminating effect, the antibacterial effect, the adsorbing effect and the filtering effect for filtering suspended substance.

The relationship between the amount of the cation exchange fiber and that of the fibrous activated carbon is the same as the embodiment 1.

As to the disposing arrangement of the two elements A1, A6, the one water-treating element A1 may be disposed upstream of the other element A6, so that the water passes the elements A1, A6 in this order. Alternatively, the other water-treating element A6 may be disposed upstream of the element A1, so that the water passes these elements A6, A1 in this order.

EMBODIMENT 8

This embodiment relates to an antibacterial water-treating element to be filled within a case of a water purifier. This antibacterial water-treating element comprises the water-treating element A1 of the embodiment 2 comprising the formed ion exchange fibers.

Accordingly, the entire antibacterial water-treating element provides the heavy metal eliminating effect, the antibacterial effect, and the filtering effect for filtering suspended substance.

OTHER EMBODIMENTS

In the foregoing embodiments, as the activated carbon, the fibrous activated carbon is used. Instead, in case the carbon is shaped into the element by using a binder, the activated carbon may be in the form of powder or granules. Also, in the case of the filling arrangement, the activated carbon may be in the form of granule.

Next, experiments conducted by the present inventors will be described.

Experiment 5

This experiment was conducted to check the heavy-metal eliminating effect of the water-treating element.

In this experiment, two types of samples, i.e. an integral type 1A and a separate type 1B, were employed.

First, there will be described the method of producing the cation exchange fiber used in the samples, i.e. cation exchange fiber bonded with silver ion and cation.

In 3000 cc of 10% solution of calcium chloride ($CaCl_2$), 100 g of strong acid ion exchange fiber (H type) was submerged and kept still therein for 30 minutes. Then, the fiber was withdrawn from the solution and dehydrated in a centrifugal dehydrator. After this dehydration, the fiber was flushed with pure water until no chlorine (Cl) ion was detected therefrom. After this water-flushing, the fiber was again dehydrated in the above-described manner, thereby to be rendered into Ca type cation exchange fiber having entire ion exchange group thereof bonded with calcium ion. Next, the fiber was kept submerged for 60 minutes in a solution in which 3 grams of silver nitrate was dissolved in 500 grams of pure water. The fiber was then dehydrated and water-flushed with pure water until no silver ion was detected from the fiber. Thereafter, the fiber was dehydrated again.

The integral type sample 1A includes the water-treating element of the same type as the water-treating element A3 of the embodiment 1. To produce this integral type sample 1A, about 3.5 grams of the cation exchange fiber produced through the the above-described process was uniformly mixed with 8.2 grams of fibrous activated carbon having a specific surface area of 1500 to 2000 $m^2/g$. Then, this mixture was filled in a cartridge having a diameter of 40 mm so that a density of the mixture was 0.18. The height of the filling was 52 mm. Then, the sample 1A includes the cylindrically shaped water-treating element filled into the case having the water inlet and the water outlet, with the height direction thereof corresponding to the direction of water passage.

The separate type sample 1B includes the first water-treating element of the same type as the water-treating element A5 of the embodiment 2 comprising the formed activated carbon and the second water-treating element of the same type as the water-treating element A1 of the embodiment 2 comprising the formed ion exchange fiber, with the two elements being disposed in this order in the direction of water passage. To produce the first water-treating element, 8.2 grams of fibrous activated carbon having a specific surface area of 1500 to 2000 $m^2/g$ was formed, by using a binder, into a cylindrical configuration having water-permeability and having a diameter of 40 mm and a density of about 0.18. To produce the second water-treating element, about 3.5 grams of the cation exchange fiber was formed, by using a binder, into a cylindrical configuration having water-permeability and having a diameter of 40 mm and a density of about 0.18. Then, the sample 1B comprises these two elements filled within a case with the water inlet and outlet to allow the water-permeability, with the height direction corresponding to the direction of water passage.

Then, as heavy metals, adjusted water containing iron (Fe) ion, zinc (Zn) ion, lead (Pb) ion, and nickel (Ni) ion was prepared. Incidentally, the iron ion was contained originally in tap water. Then, to prepare the adjusted water, the zinc ion and the lead ion in the form of chlorides thereof and the nickel ion in the form of sulfate were added to the tap water.

For the experiment, the above-described adjusted water was supplied at the space velocity of either SV=1000 or SV=5000 through the respective samples. And, after each predetermined amount of supply of the water, the amount of heavy metals were measured.

The result of the case of SV=1000 is shown in Table 5. And, the result of the other case of SV=5000 is shown in Table 6, respectively.

Experiment 6

In this experiment, the free chloride eliminating effect of the water-treating element was checked.

As a sample element relating to the present invention, a sample element 2A substantially the same as the integral type element 1A used in the experiment 5 was used. As a reference sample for comparison, a sample element 2B was prepared. Namely, 11.7 g of fibrous activated carbon having a specific surface area of 1500 to 2000 $m^2/g$ was formed, by using the binder, into a cylindrical configuration having the water-permeability and having a diameter of 40 mm, height of 52 mm and a density of about 0.18. Then, this formed carbon was filled with the case with the water inlet and outlet having the water-permeability, with the height direction thereof corresponding to the direction of the water passage.

For the experiment, un-treated water was supplied to the respective samples at the space velocity: SV=5000. Then, after each predetermined amount of supply of the water, concentrations (mg/l) of the free chloride ($Cl_2$) in the water were measured. Incidentally, both the sample 2A of the present invention and the comparison reference sample were supplied with the water at the flow rate of 5.4 l/min.

The results are shown in Table 7.

As may be seen in the results of Table 7, as an amount of water treatable per 1 g of activated carbon for elimination of 80% of free chlorine from the supplied un-treated water having free chlorine concentration of 2 ppm, the value of this amount in the case of the comparison reference sample is lower than about 140 l/g, while that of the sample of the present invention is about 290 l/g. This shows that the sample 2A of the invention comprising the mixture of the ion exchange fiber and the activated carbon fiber has the water treating capacity about 2 times higher than the comparison reference sample 2B comprising the fibrous activated carbon alone.

Experiment 7

In this experiment, the free chlorine eliminating ability was checked.

As samples, a sample 3A of the same type as the separate type 1B used in the experiment 5 and a comparison reference sample 3B of the same type as the reference sample 2B used in the experiment 6 were prepared.

The experiment was conducted in the same manner as the above-described experiment 6.

The results are shown in Table 8.

Experiment 8

In this experiment, the antibacterial effect of the water-treating element was checked.

As sample elements relating to the present invention, two samples were used; namely, a sample element 4A comprised of the same cation exchange fiber as used in the experiment 5 and the fibrous activated carbon in the mixture ratio of 3 to 7, with the mixture being filled in a single cartridge, and another sample element 4B comprised of the cation exchange fiber of the experiment 1 filled in one cartridge and the fibrous activated carbon filled in another cartridge. As reference sample elements for comparison, three samples were used; namely, a sample element 4C containing the fibrous activated carbon and hollow fiber membrane, and another sample element 4D comprised of fibrous activated carbon mixed with 4 wt. % of silver zeolite as an antibacterial agent thereof, and a further sample element 4E comprises solely of fibrous activated carbon.

Volumes of the above-described sample elements 4A through 4E are all the same.

After supplying 1000 l of water through the respective elements, the water entrapped within the elements was left still for 48 hours. Thereafter, 0 to 200 ml, 200 to 500 ml and 500 to 1000 ml of water was flushed out of the elements, respectively. Then the numbers of living germs (cells/ml) in the flushed-out portions of the water were measured. The water temperature was 18 degrees in Celsius.

The results are shown in Table 9, in which the reference mark 'ND' denotes no detection of living germs.

Further, in Tables 5, 7 and 8, the term: "or less" denotes values lower than the limit of detection.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

TABLE 1

| | type | | | | | | | | | | |
|---|---|---|---|---|---|---|---|---|---|---|---|
| | conventional antibacterial fiber | | | | | antibacterial fiber of invention | | | | | |
| | mixture ratio | | | | | | | | | | |
| | 0.2 | 0.5 | 1.0 | 2.0 | 3.0 | 0.2 | 0.5 | 1.0 | 2.0 | 3.0 | blank |
| test | | | | | | | | | | | |
| sample-1 | many | many | $2.4 \times 10^4$ | $1.9 \times 10^2$ | ND | $2.6 \times 10^3$ | ND | ND | ND | ND | $2.4 \times 10^7$ |
| sample-2 | many | many | $5.7 \times 10^3$ | $2.3 \times 10^2$ | ND | $1.9 \times 10^2$ | ND | ND | ND | ND | $5.9 \times 10^7$ |
| sample-3 | many | many | $2.9 \times 10^3$ | $2.8 \times 10^2$ | ND | $4.4 \times 10^2$ | ND | ND | ND | ND | $2.1 \times 10^7$ |

(unit: cells/ml)

TABLE 2

| | type | | | | | | | | | | |
|---|---|---|---|---|---|---|---|---|---|---|---|
| | conventional antibacterial nonwoven fabric | | | | | antibacterial nonwoven fabric of invention | | | | | |
| | mixture ratio | | | | | | | | | | |
| | 0.2 | 0.5 | 1.0 | 2.0 | 3.0 | 0.2 | 0.5 | 1.0 | 2.0 | 3.0 | blank |
| test | | | | | | | | | | | |
| sample-1 | many | many | $3.7 \times 10^4$ | $2.6 \times 10^2$ | ND | $3.7 \times 10^2$ | ND | ND | ND | ND | $2.7 \times 10^7$ |
| sample-2 | many | many | $2.3 \times 10^4$ | $8.9 \times 10^2$ | ND | $3.1 \times 10^2$ | ND | ND | ND | ND | $2.9 \times 10^7$ |
| sample-3 | many | many | $4.1 \times 10^4$ | ND | ND | $2.5 \times 10^2$ | ND | ND | ND | ND | $4.1 \times 10^7$ |

(unit: cells/ml)

TABLE 3

| | type | | | | | | | | | | | |
|---|---|---|---|---|---|---|---|---|---|---|---|---|
| | fiber of Ag type (Ag 5%) | | | | fiber of Ag—Cu type (Ag 4%, Cu 1%) | | | | fiber of Ag—Zn type (Ag 4%, Zn 1%) | | | |
| | mixture ratio | | | | | | | | | | | |
| | 0.2 | 0.5 | 1.0 | 2.0 | 0.2 | 0.5 | 1.0 | 2.0 | 0.2 | 0.5 | 1.0 | 2.0 | blank |
| test | | | | | | | | | | | | | |
| sample-1 | $4.7 \times 10^3$ | ND | ND | ND | $5.4 \times 10^3$ | ND | ND | ND | $6.7 \times 10^3$ | ND | ND | ND | $3.9 \times 10^6$ |
| sample-2 | $4.1 \times 10^3$ | ND | ND | ND | $4.6 \times 10^3$ | ND | ND | ND | $6.1 \times 10^3$ | ND | ND | ND | $2.8 \times 10^6$ |
| sample-3 | $2.9 \times 10^3$ | ND | ND | ND | $4.9 \times 10^3$ | ND | ND | ND | $5.5 \times 10^3$ | ND | ND | ND | $4.4 \times 10^6$ |

(unit: cells/ml)

TABLE 4

| | type | | | | | | | | | | | |
|---|---|---|---|---|---|---|---|---|---|---|---|---|
| | nonwoven fabric of Ag type (Ag 5%) | | | | nonwoven fabric of Ag—Cu type type (Ag 4%, Cu 1%) | | | | nonwoven fabric of Ag—Zn type (Ag, 4%, Zn 1%) | | | |
| | mixture ratio | | | | | | | | | | | |
| | 0.2 | 0.5 | 1.0 | 2.0 | 0.2 | 0.5 | 1.0 | 2.0 | 0.2 | 0.5 | 1.0 | 2.0 | blank |
| test | | | | | | | | | | | | | |
| sample-1 | $1.5 \times 10^3$ | ND | ND | ND | $2.7 \times 10^3$ | ND | ND | ND | $6.2 \times 10^3$ | ND | ND | ND | $4.7 \times 10^6$ |
| sample-2 | $2.8 \times 10^3$ | ND | ND | ND | $9.1 \times 10^3$ | ND | ND | ND | $4.1 \times 10^3$ | ND | ND | ND | $1.8 \times 10^6$ |
| sample-3 | $1.9 \times 10^3$ | ND | ND | ND | $3.2 \times 10^3$ | ND | ND | ND | $4.3 \times 10^3$ | ND | ND | ND | $9.0 \times 10^5$ |

(unit: cells/ml)

TABLE 5

| | water amount | heavy metal ion (μg/l) | | | |
|---|---|---|---|---|---|
| | | Fe | Zn | Pb | Ni |
| element | | | | | |
| 1A | before treatment | 150 | 160 | 157 | 145 |
| | 10 l | 90 | 10 or less | 50 | 10 or less |
| | 100 l | 54 | 10 or less | 10 | 4 or less |
| | 500 l | 49 | 10 or less | 12 | 4 or less |
| | 1000 l | 50 | 10 or less | 12 | 4 or less |
| 1B | before treatment | 150 | 320 | 340 | 370 |
| | 10 l | 70 | 10 or less | 47 | 4 or less |
| | 100 l | 50 | 10 or less | 12 | 2 or less |
| | 500 l | 50 | 10 or less | 12 | 2 or less |
| | 1000 l | 50 | 10 or less | 12 | 2 or less |

TABLE 9

| | micro-organism (cells/cc) | | |
|---|---|---|---|
| | 0–200 cc | 200–500 cc | 500–1000 cc |
| Sample | | | |
| 4A | 2 | ND | ND |
| | 1 | ND | ND |
| 4B | 1 | ND | ND |
| | 4 | ND | ND |
| 4C | 3 | ND | ND |
| | 1 | ND | ND |
| 4D | 1 | ND | ND |
| | 1 | ND | ND |
| 4E | 1670 | 424 | 150 |
| | 1950 | 546 | 187 |

TABLE 6

| element | water pasage amount | heavy metal ion (µg/l) | | | |
|---|---|---|---|---|---|
| | | Fe | Zn | Pb | Ni |
| 1A | adjusted water | 100 | 155 | 160 | 150 |
| | 10 l | 70 | 20 | 10 | 40 |
| | 100 l | 70 | 20 | 10 | 40 |
| | 500 l | 70 | 110 | 20 | 40 |
| | 1000 l | 70 | 140 | 50 | 70 |
| 1B | adjusted water | 100 | 165 | 150 | 157 |
| | 10 l | 70 | 25 | 10 | 40 |
| | 100 l | 70 | 25 | 10 | 40 |
| | 500 l | 70 | 95 | 20 | 50 |
| | 1000 l | 70 | 140 | 50 | 80 |

TABLE 7

| water passage amount (l) | concentration of remaining chlorine (mg/l) | 2B | 2A |
|---|---|---|---|
| 0 | 1.9 | 0.01 or less | 0.01 or less |
| 100 | 1.9 | 0.01 or less | 0.01 or less |
| 200 | 2.2 | 0.04 | 0.01 or less |
| 400 | 1.9 | 0.06 | 0.01 or less |
| 600 | 1.9 | 0.15 | 0.01 or less |
| 800 | 2.0 | 0.24 | 0.01 or less |
| 1000 | 2.1 | 0.35 | 0.04 |
| 1200 | 1.9 | 0.41 | 0.05 |
| 1400 | 2.2 | | 0.11 |
| 1600 | 2.1 | | 0.25 |
| 1800 | 2.1 | | 0.29 |
| 2000 | 2.0 | | 0.32 |
| 2200 | 1.9 | | 0.35 |
| 2400 | 2.0 | | 0.37 |
| 2600 | 2.0 | | 0.41 |

TABLE 8

| water passage amount (l) | concentration of remaining chlorine (mg/l) | 3B | 3A |
|---|---|---|---|
| 0 | 2.1 | 0.01 or less | 0.01 or less |
| 100 | 2.0 | 0.01 or less | 0.01 or less |
| 200 | 2.0 | 0.09 | 0.01 or less |
| 400 | 1.9 | 0.10 | 0.02 |
| 600 | 1.9 | 0.15 | 0.04 |
| 800 | 1.9 | 0.21 | 0.11 |
| 1000 | 2.0 | 0.32 | 0.15 |
| 1200 | 2.2 | 0.39 | 0.21 |
| 1400 | 2.1 | 0.45 | 0.31 |
| 1600 | 1.9 | | 0.42 |
| 1800 | 1.9 | | |
| 2000 | 1.9 | | |
| 2200 | 1.9 | | |
| 2400 | | | |
| 2600 | | | |

What is claimed is:

1. A method of producing an antibacterial fiber comprising the steps of:

bonding, through an ion exchange reaction, complex ion of silver, copper or zinc with ion exchange group of cation exchange fiber having sulfonic or carboxyl group as ion exchange group thereof; and reducing the complex ion.

2. A method of producing an antibacterial fiber comprising the steps of:

bonding, through an ion exchange reaction, complex ion of silver, copper or zinc with ion exchange groups of an anion exchange fiber having primary through tertiary amine groups and quaternary ammonium group; and reducing the complex ion.

3. A method of producing an antibacterial fiber containing at least silver ion, which comprises the steps of:

bonding, through an ion exchange reaction, a cation of more than one kind of alkali metals or alkaline earth metals selected from the group consisting of Na, K, Ca and Mg with entire ion exchange groups of a cation exchange fiber having sulphonic acid groups or carboxyl groups as ion exchange groups thereof; and replacing a portion of said alkali metals or alkaline earth metals bonded to said ion exchange groups with said silver ion alone or with said silver ion and either copper ion or zinc ion in combination.

4. A method according to claim 3, wherein an amount of the exchange exchanged by said silver, copper and zinc ions is less than 50% of a total cation exchange capacity of said ion exchange fiber.

5. A method according to claim 3, wherein an amount of the exchange exchanged by said silver, copper and zinc ions is less than 20% of a total cation exchange capacity of said ion exchange fiber.

* * * * *